United States Patent [19]

Loos

[11] Patent Number: 4,667,503

[45] Date of Patent: May 26, 1987

[54] METHOD OF CALIBRATING VOLUMETRIC METERING AND BLENDING DEVICE

[75] Inventor: Bruce J. Loos, Roanoke, Ind.

[73] Assignee: Monarch Specialty Systems, Inc., Ossian, Ind.

[21] Appl. No.: 808,009

[22] Filed: Dec. 11, 1985

[51] Int. Cl.⁴ .................... G01F 25/00; G01M 19/00
[52] U.S. Cl. ........................ 73/3; 73/865.9; 73/861; 366/141
[58] Field of Search ............. 73/1 R, 1 H, 3, 865.9, 73/861; 366/141, 18

[56] References Cited

U.S. PATENT DOCUMENTS 2,664,907 1/1954 Lowe ........................ 73/1 R X
4,502,416 3/1985 Keysell et al. .............. 366/145 X

FOREIGN PATENT DOCUMENTS 1319221 6/1973 United Kingdom ............. 73/3

Primary Examiner—Tom Noland
Attorney, Agent, or Firm—Thomas J. Dodd

[57] ABSTRACT

A calibration method for a volumetric metering and blending device which involves the use of a memory base to calculate and control the speed in which an auger dispenses each quantity of ingredient into a hopper. The method involves operatively connecting the memory base to each of a plurality of ingredient hoppers which include feed dispensing augers, with each ingredient hopper being in flow communication with a central weighing hopper. To pre-calibrate the desired speed for each auger necessary to dispense a premeasured quantity of feed into the central hopper, a premeasured quantity of feed is dispensed from each ingedient hopper into the central hopper with the number of turns of the auger being recorded in the memory base. This value is then converted into a revolutions per minute figure for each auger, and by regulating the speed of the feed dispensing augers, the correct ratio of ingredients is dispensed from each ingredient hopper into the central hopper for producing a feed mix.

2 Claims, 1 Drawing Figure

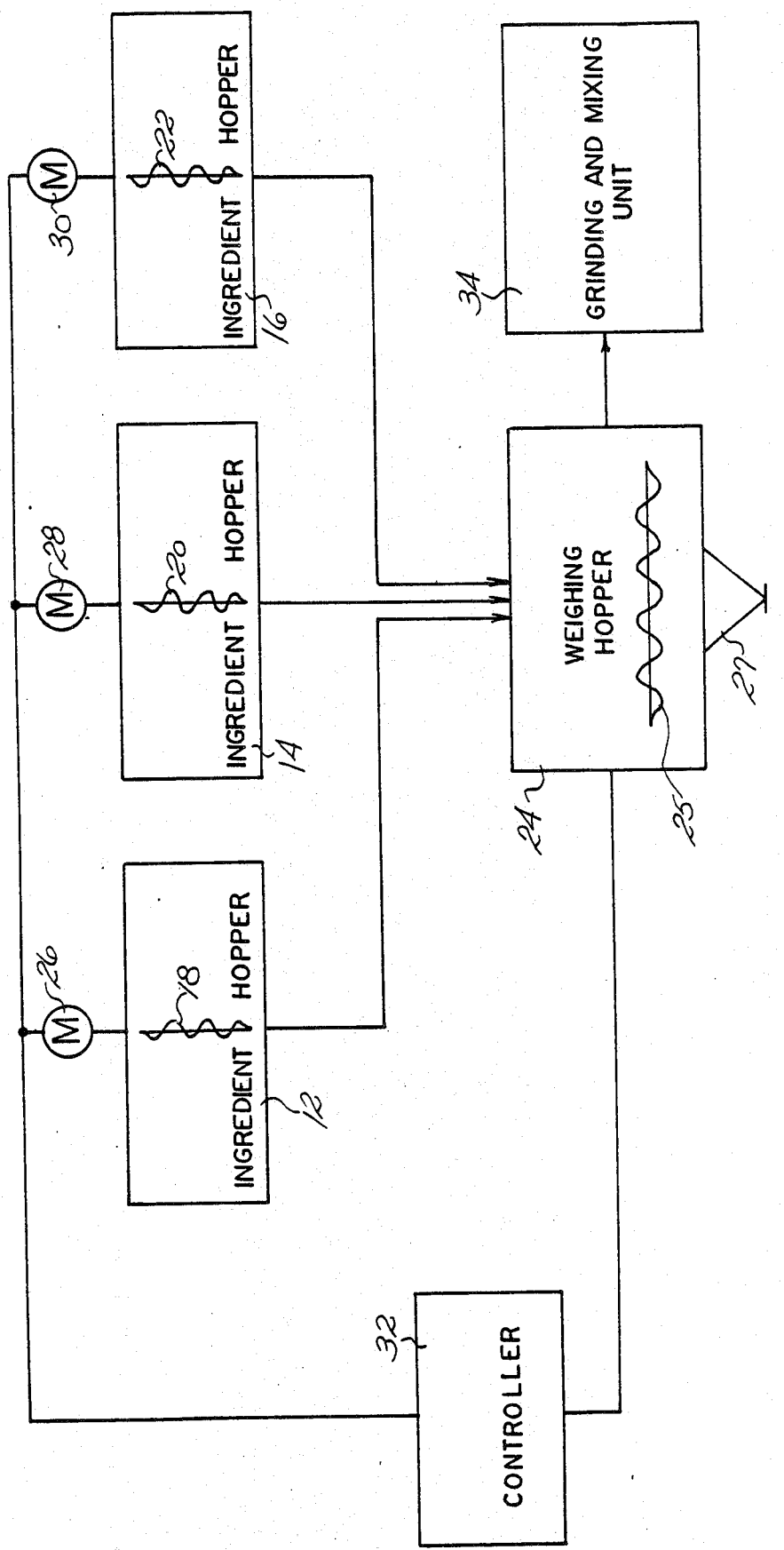

METHOD OF CALIBRATING VOLUMETRIC METERING AND BLENDING DEVICE

BACKGROUND OF THE INVENTION

This invention relates to a method of calibrating a device which continually dispenses items to be mixed, and will have special but not limited application to calibrating a feed mill.

There are currently two accepted methods of mixing various feed grains to form a suitable feed for farm livestock. The first, batch mixing, involves the grinding of a quantity of feed grain in a hopper, then adding desired other ingredients at their desired ratios, thereafter agitating for a period of time to produce the mix. The common method of determining desired ratios is weight. Batch mixing is highly efficient in insuring that the correct ratio of the ingredients is present in the feed. However, batch mixing is time consuming, requires very large, expensive equipment, and does not provide for adequate agitation and mixing of the ingredients. The second, continuous volumetric metering and blending involves a plurality of metering devices to produce the continuous addition of ingredients to the hopper where blending takes place. The method is highly efficient in producing a homogenous feed mixture, is inexpensive relative to batch mixing, and takes up less time and space. However, calibration of such an apparatus must be precise to insure that ingredients are added to the mixture in their correct proportions.

SUMMARY OF THE INVENTION

The method of this invention allows the ratio accuracy feature of batch mixing by weight to be combined with a continuous volumetric metering and blending system. The method involves the individual precalibration of the metering members, usually augers, which control the dispense rate of the ingredients, such as feed, into a weighing hopper. The precalibration information is fed into a memory base which is coupled to the motor drives for the metering augers to control ingredient flow rate during continuous feed flow.

Accordingly, it is an object of this invention to provide for an automatic method of calibrating a volumetric metering and blending device.

Another object of this invention is to provide for a calibration method which allows accurate metering of ingredients in a continuous feed flow operation.

Another object of this invention is to provide for an improved method of continuously blending livestock feed.

Other objects of this invention will become apparent upon a reading of the following description.

BRIEF DESCRIPTION OF THE DRAWINGS

FIG. 1 is a diagrammatical view of the components which can be used in practicing the method of this invention.

DESCRIPTION OF THE PREFERRED EMBODIMENT

The preferred embodiment herein described is not intended to be exhaustive or to limit the invention to the precise steps disclosed. It is chosen and described to explain the principles of the invention and its application and practical use to enable others skilled in the art to utilize the invention.

The method of this invention may be best understood by referring to the accompanying drawing in conjunction with this disclosure. FIG. 1 diagrammatically depicts a volumetric metering device which is used to dispense and mix feed ingredients in predetermined proportions. The device includes a plurality of separate ingredient hoppers 12, 14, and 16 each housing a different type of ingredient. The number of ingredient hoppers will vary depending upon the number of individual ingredients to be mixed. For purposes of illustration we will refer to hopper 12 as containing corn, hopper 14 as containing soybean meal, and hopper 16 as containing a base mix of vitamins and minerals. Each such hopper 12, 14, and 16 includes a dispensing auger 18, 20 and 22 respectively in the drawings. Each hopper is in flow communication with a weighing hopper 24. Connected to each dispensing auger 18, 20, and 22 is a metering motor 26, 28, 30 each of which is connected to a controller 32 such as a computer which includes a programmable memory bank.

The precalibration step of the method is as follows. A predetermined quantity of corn is dispensed from hopper 12 into weighing hopper 24 by the activation of auger 18 through motor 26 upon command of controller 32. The amount of the corn in weight dispensed into hopper 24 corresponds to the exact weight ratio of the desired feed mixture. Weighing hopper 24 includes sensors 27 through which controller 32 determines when the exact predetermined weight or amount of corn has been dispensed into the weighing hopper. At this point controller 32 stops auger 18 with the number of turns which auger 18 has taken being stored in the controller. The same procedure is then repeated for the soybean meal and base mix with regard to their respective augers 20 and 22 to obtain their exact weight ratios. Controller 32 then calculates for each ingredient the amount of the ingredient fed to hopper 24 for each turn of the dispensing auger for the desired feed mix. This is done by dividing the ingredient measured weight by the number of auger turns. Next controller 32 will determine the proper dispensing auger speed for each ingredient to allow for the continuous volumetric metering of the feed mix at a selected mixing rate. After which, the dispensing augers 18, 20 and 22 and auger 25 in the weighing hopper 24 are started by controller 32 and maintained at proper speed. Auger 25 includes a drive motor which is regulated by controller 32. Feed is then delivered to a mixing hopper 34 for further processing. The following hypothetical example is intended to better illustrate the method as outlined above.

EXAMPLE

A farmer is preparing a livestock feed mix which will contain 3600 pounds of corn, 1800 pounds of soybean meal, and 600 pounds of base mix. To precalibrate the dispensing and calibration device heretofore described, a 50-pound sample is calibrated. First, 30 pounds of corn are dispensed into the weighing hopper 24 by 30 revolutions of the corn dispensing auger 18. Second, 15 pounds of soybean meal is dispensed into hopper 24 in 30 revolutions of the soybean meal dispensing auger 20. Finally, 5 pounds of base mix are dispensed in 10 revolutions of the base mix dispensing auger 22. In actual practice, such auger revolutions or portions thereof are recorded by the controller's microprocessors as impulses. The controller 32 determines from the 50 pound sample that one auger 18 revolution produces one pound of corn, one auger 20 revolution produces one-half pound of soybean meal, and one auger 22 revolution produces one-half pound of base mix. If, as example, the 600 pounds of mix is to be fed into mixing hopper 34 at 100 pounds per minute (in proportion, 100 pounds of mix has 60 pounds of corn, 30 pounds of soybean meal, and 10 pounds of base mix), then controller 24 determines auger 18 must be rotated 60 revolutions per minute, auger 20 must be rotated 60 revolutions per minute, and auger 22 must be rotated 20 revolutions per minute to provide a continuous blending of the ingredients as they enter hopper 24. The user or farmer sets the mixing rate in hopper 34 with the controller regulating the proportional speed of the dispensing augers to allow continuous blending of the ingredients. Except for weighing each mix sample during calibration, hopper 24 serves only as a depository for the blended ingredients as they are transferred by auger 25 to the mixing hopper 34. The motors 26, 28, 30 of augers 18, 20, 22 are started and brought to the above determined proper calculated rotational speed by controller 32 allowing the proper ingredient mix to be first blended in weighing hopper 24 for transportation by auger 25 to mixing hopper 34.

Controller 32 may be programmed to recalibrate the feed system after so many pound increments of mix have been mixed or simply allow the entire feed mix to be completed. Weighing hopper 24 need not be emptied to recalibrate the feed system since it records the tare weight of each ingredient of the sample.

It is understood that the above description does not limit the invention but may be modified within the scope of the appended claims.

I claim:

1. A method of calibrating a volumetric blending device comprising the steps of:
    (A) providing a plurality of hoppers, each hopper containing a separate ingredient, speed regulatable means associated with each hopper for dispensing feed into a single receiving member in proportion to the speed of said dispensing feed means, and motor means for controlling the speed of each dispensing feed means;
    (B) dispensing separately and sequentially a premeasured quantity by weight of each ingredient into said receiving member upon actuation of each dispensing feed means, each premeasured quantity of ingredient forming a proportionate part of the weight ratio of ingredients in the desired mix;
    (C) recording a value based on the movement of each dispensing feed means for each ingredient representative of the amount of such ingredient dispensed into said receiving member;
    (D) associating each recorded value with the motor means of each dispensing feed means to provide continuous volumetric metering of each ingredient as a said proportionate part to produce said mix.

2. The method of claim 1 wherein each dispensing feed means is an auger and step (C) includes determining the number of turns completed by the auger to dispense the amount of ingredient into said receiving member, and step (D) includes the conversion of said number of turns into a rotative speed for said auger to produce said ingredient weight ratio, said motor means for the auger being set to said rotative speed.

* * * * *